United States Patent [19]

Allard

[11] 3,984,380
[45] Oct. 5, 1976

[54] DIFFICULTLY INFLAMMABLE YARNS, FIBERS AND FILMS OF PHOSPHORUS CONTAINING POLYESTERAMIDES AND PROCESS FOR OBTAINING THEM

[75] Inventor: Pierre Allard, Fontaines-sur-Saone, France

[73] Assignee: Rhone-Poulenc-Textile, Paris, France

[22] Filed: Nov. 6, 1974

[21] Appl. No.: 521,508

Related U.S. Application Data

[62] Division of Ser. No. 472,155, May 22, 1974.

[30] Foreign Application Priority Data

June 1, 1973  France .............................. 73.20277
July 24, 1973  France .............................. 73.27318

[52] U.S. Cl. .............................. 260/78 R; 260/30.2; 260/47 CB; 260/47 CZ; 260/76; 260/77; 264/331; 428/474
[51] Int. Cl.² .......................................... C08G 69/32
[58] Field of Search .......... 260/78 R, 47 CZ, 47 CB

[56] References Cited
UNITED STATES PATENTS

| | | | |
|---|---|---|---|
| 2,547,113 | 4/1951 | Drewitt et al. | 260/75 R |
| 3,475,385 | 10/1969 | Goodman et al. | 260/78 R |
| 3,493,544 | 2/1970 | Goodman et al. | 260/78 R |
| 3,554,983 | 1/1971 | Goodman et al. | 260/78 R |

*Primary Examiner*—Harold D. Anderson
*Attorney, Agent, or Firm*—Stevens, Davis, Miller & Mosher

[57] ABSTRACT

The invention concerns new difficultly inflammable polyesteramide yarns, fibers and films.

These yarns, fibers or films consist of a polymer obtained from the reaction of at least one aromatic diisocyanate and aromatic diacids, at least one of said diacids containing one or more ester groups.

These new yarns, fibers and films are employed in all fields in which properties of low inflammability are desired.

5 Claims, No Drawings

DIFFICULTLY INFLAMMABLE YARNS, FIBERS AND FILMS OF PHOSPHORUS CONTAINING POLYESTERAMIDES AND PROCESS FOR OBTAINING THEM

This is a division of application Ser. No. 472,155, filed May 22, 1974.

The present invention relates to yarns, fibers and films formed of difficultly inflammable, aromatic copolyesteramide polymers and a method of preparing the same.

Linear polyesteramides which may be entirely aromatic, which are capable of being shaped into yarns, fibers and films, are known from French Patent 1,474,377, but the ester groups and the amide groups are distributed irregularly in the chain, and the products cited by way of example have melting points of between 150°C and 300°C.

It is known from French Patent 1,578,154 that aromatic polyamides can be obtained by reaction of a diacid with a diisocyanate. But it is not contemplated that the diacid may have ester groups.

It is known from Belgian Patent 665,928 and from German Patent 922,255 to couple polyesters of medium molecular weight having acid terminal groups by means of a diisocyanate, but these processes are carried out under conditions which lead to crosslinkings.

There have now been found — and this constitutes the object of the present invention — difficultly inflammable yarns, fibers, and films formed of aromatic copolyesteramide polymers obtained by extruding filaments by the known wet or dry processes or casting a film of a solution of the polymer, characterized by the fact that these copolyesteramides comprise linkages of the form —NH—Ar$_1$—NH—, of the form —CO—Ar$_2$—CO—, —OC—Ar$_3$—Y$_a$—(Ar$_4$)$_b$—Y$_c$—Ar$_5$—CO— and in some cases

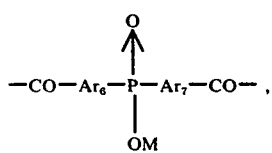

in quantity of 4–30 mol %, preferably 6–20 mol % with respect of acid units, Ar$_1$, Ar$_2$, Ar$_3$, Ar$_4$, Ar$_5$, Ar$_6$, Ar$_7$ representing a divalent aromatic radical, Y being

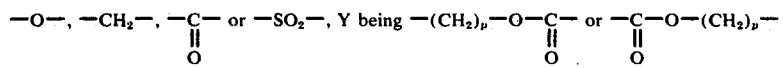

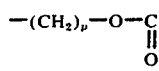

or —C—O—(CH$_2$)$_p$— with $p>1$, and $a$, $b$ and $c$ being equal to 0 or 1, at least one of the subscripts $a$ or $c$ being equal to 1, and M being an alkali metal.

The invention also concerns a process for obtaining these yarns, fibers and films which comprises preparing the copolyesteramides by reaction, in substantially stoichiometric quantity, of at least one aromatic diisocyanate and aromatic dicarboxylic acids at least one of said diacids containing one or two ester groups, which reaction may be conducted in the presence of 4–30 mol%, preferably 6–20 mol% with respect of acid units of a polycondensation accelerating agent of the formula:

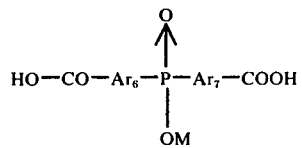

in an anhydrous, aprotic, polar solvent medium, the temperature being raised gradually to 200°C, and shaping the resultant solution by extrusion by the wet or dry process or casting as a film.

In the process of the invention, the reagents are placed in solution in a temperature range of between 25°C and 130°C at ambient pressure or in a partial vacuum, the temperature being then increased during the reaction at a rate of between 0.2° and 5°C per minute and preferably between 0.5°, and 2°C per minute, up to at most 200°C and even 190°C in the event that one is operating in the presence of the polycondensation accelerating agent.

By substantially stoichiometric quantity within the meaning of the present invention there are meant molar ratios of carboxylic diacids to diisocyanates close to 1, and preferably between 0.90 and 1.20.

The diisocyanates included within the scope of the invention are of the formula: $O=C=N-Ar_1--=N=C=O$.

the carboxylic diacids are of the formula:

or of the formula:

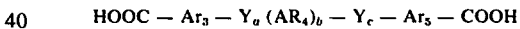

Ar$_1$, Ar$_2$, Ar$_3$, Ar$_4$, Ar$_5$ representing divalent aromatic radicals with bonds either in meta or preferably in para position, such as

where $i = 0$ or 1, X being with $p \geq$ to 1, and preferably $p = 1$ or 2, the subscripts $a$, $b$ and $c$ being equal to 0 or 1, at least one of the subcripts $a$ or $c$ being equal to 1, at least one of the diacids being of the formula HOOC—Ar$_3$—Y$_a$—(Ar$_4$)$_b$—Y$_c$—Ar$_5$—COOH.

Among the diisocyanates which can be used within the scope of the invention, mention may be made of toluylene diisocyanate (2-4 or the mixtures of 2-4 and 2-6 isomers), diisocyanato 4-4' diphenyl propane, diisocyanato 4-4' diphenyl ether, and preferably diisocyanato 4-4' diphenyl methane.

Among the dicarboxylic acids there are used more particularly terephthalic acid, isophthalic acid, and bis (4-carboxy benzyl) terephthalate. The proportion of diacid ester in the diacid/diacid ester mixture may go up to close to 100 % but must be such that there are at least 15 ester bonds per 100 total amide and ester bonds.

The molecular weight of the diacid ester will preferably be less than 800.

When the polycondensation accelerating agent of phosphinic type illustrated above is present, it should be present in a proportion of at least 4 mols per 100 and preferably 6 mols per 100 mols of the total dicarboxylic acids in order to be effective; it is preferred to use the polycondensation accelerating agent in a proportion of at most 30 mols %, preferably at most 20 mols %, in order to avoid the formation of chains having too much phosphorus, what would result in an increase of solubility of the polymer in the coagulating bath.

Among these agents, use is made more particularly of the monosodium salt of bis (carboxy-4 phenyl) phosphinic acid.

As solvent medium there is used an anhydrous, aprotic, polar organic solvent, that is to say, one containing less than 600 ppm of water, and preferably less than 200 ppm, such as:

linear or cyclic amides or phosphoramides such as dimethyl acetamide, hexamethyl phosphoryl triamide, tetramethyl urea, and preferably N-methyl-2 pyrrolidone, sulfones such as tetramethylene sulfone, etc.

The presence of an agent which permits the obtaining of bright fibers by wet-spinning, such as sodium dicarboxy 3-5 benzene sulfonate, is desirable but not indispensable; it may be introduced at the same as the reagents and participates in the polycondensation reaction.

Fillers, pigments, optical brighteners and other products which are inert with respect to the reaction may also be added to the reaction medium.

The reagents may be dissolved in the solvent simultaneously or in succession or be dissolved separately and the solutions then mixed.

The concentration of the total reagents in the starting solution is between 5 and 50 %, and preferably between 15 and 40 %, expressed in weight of polymer obtained per 100 g of solution, that is to say, after deduction of the weight of $CO_2$ eliminated in the condensation between the isocyanate and carbonyl groups.

In the first phase of the process, the different components are introduced into a reactor provided with an agitator, a thermometric jacket, a reflux condenser and a dry nitrogen inlet, and the temperature of which is between 20°C and 130°C.

A strong liberation of $CO_2$ takes place between 80 and 120°C and continues as the temperature of the reaction mixture rises at a rate of between 0.2°C and 5°C per minute.

The total time of the operation is less than or equal to 15 hrs and more particularly of the order of 3 hrs., at the end of which time there is obtained a solution of a viscosity of between 200 and 5,000 poises, which may be obtained by dilution of the final mixture with the necessary amount of solvent. During the entire operation, sufficient agitation is maintained to assure homogeneous heating, which is indispensable for good development of the reaction.

The inherent viscosity of the products obtained is greater than 0.5 and preferably greater than 0.9.

In the second phase of the processing of the yarns, fibers and films in accordance with the invention, the solution obtained in the first phase is extruded by the wet or dry process, in accordance with known procedures, for instance by the process described in French Patent 2,079,785.

In the case, for instance, of wet-spinning, the solution is extruded through a spinneret immersed in a coagulation bath which comprises a mixture of the solvent of the solution and water in proportions of between 20 and 80 parts of solvent to 100 parts of bath; the gel formed undergoes stretching in air at a rate of about 3 times and which is then washed and wound up.

It may also be subjected to a continuous over-drawing at a rate of the order of 1.5 times in a furnace brought to 250°C.

In the case of dry spinning the solution is extruded in a dry spinning cell in which a part of the solvent is eliminated so that the filaments only contain 50 to 150 % by weight of solvent at their exit from the cell; they are then washed at a temperature between about 60°C to 90°C and stretched of about 3 times and eventually over-drawn of about 1.5 times at 250°C in a furnace.

For the production of a film, the solution whose viscosity has been lowered to about 100 poises by dilution is poured onto a glass plate which is then brought to a temperature of between 80°C and 200°C in a stove where a vacuum of the order of 1 mm of mercury is gradually established; in a preferred embodiment, the film is first of all dried at 120°C under 650 mm Hg and then peeled from the plate and dried under vacuum between 150° and 200°C.

The yarns, fibers and films in accordance with the invention are colorless or slightly colored; the copolyesteramides of which they are formed have a better thermal behavior than the polyesteramides known up to now, melting and carbonization taking place only above 300°C. Furthermore, when they contain chains derived from the phosphinic derivatives, they have no melting point, carbonization takes place only above 380°C, and the post-incandescence phenomenon is non-existent.

They are of low inflammability and their mechanical properties are of the same order of magnitude as those of other inflammable synthetic yarns, fibers or films.

The yarns, fibers and films in accordance with the invention can be used in all fields in which the property of non-inflammability is desired, such as upholstery, protective clothing, as well as in certain industrial uses.

The following examples are given by way of illustration and not of limitation. In these examples:

the absolute viscosity of the solutions is measured at 25°C by means of an Epprecht Rheomat 15 apparatus, the inherent viscosity $\eta = Ln(t/t_o)/C$ is measured at 25°C on an 0.5 g solution of polymer in 100 ml of the solvent for the preparation of the polymer, $t$ and $t_o$ being the flow times of the solution and solvent, and $C$ the concentration of the solvent, expressed in weight per volume, the differential thermal analysis curve is recorded on a Type 900 apparatus of Du Pont Instrument, the sample, whether yarn or film, being compared with glass balls as a control, the dynamometric characteristics of the fibers are determined after conditioning at 22°C and relative humidity of 65%.

The tests for the determination of the degree of inflammability are carried out on knits weighing about 90 g/m², desized, conditioned at 22°C and a relative humidity of 65%.

They are:

the determination of the Oxygen Index (minimum concentration of oxygen for combustion): there is concerned here ASTM Standard B 2863-70 covering plastic test bars, modified and adapted to textile samples or films of dimensions of 5 × 16 cm mounted on a rectangular frame, Test AATCC 34-1969 developed in the USA: the value given is the duration of burning after application of a flame fed by a gaseous mixture ($H_2 + CH_4 + C_2H_6 + CO$) for 12 seconds and then withdrawn; the post-incandescence is determined by the duration of the incandescence after extinction of the flame, the gas-flame test: this is carried out on samples of 5 cm × 15 cm. The sample is placed astride a horizontal rod and fastened thereon at one of its ends; the flame of a Bunsen burner is applied for 5 seconds to the free end of the sample; if extinction takes place upon withdrawal of the flame, the flame is again applied for 10 seconds and then for 20 seconds and then 30 seconds if necessary, and the duration of the successive combusions is noted.

The post-incandescence which is the time of slow combustion of the material brought to red heat after the cessation of any flame is expressed in seconds.

Transparent, slightly yellowish films of different thicknesses are obtained.

These films exhibit good thermal behavior, as shown by a differential thermal analysis curve which is uniform up to 450°C. Beyond that, the product carbonizes without melting.

The results of the inflammability tests are as follows:

TABLE I

|  | Oxygen index | Height destroyed in cm | Application of the flame in sec | Time of combustion in sec | Post-incandescence in sec |
|---|---|---|---|---|---|
| Oxygen Index min. conc. of $O_2$ for combustion | 25.5 | | | | |
| AATCC Test 34-1969 | | 7.5 | | 0 | 4 |
| Gas-flame test | | | 5 | 4 | 5 |
| | | | 10 | 4 | 8 |
| | | | 20 | 8 | 17 |
| | | | 30 | 0 | 15 |

EXAMPLE 1

Into a 500-ml reactor provided with heating and agitating means and the temperature of which has been brought to 80°C there are introduced:

- 33.60 g (0.132 mol) of diisocyanato 4-4'diphenyl ether
- 20.12 g (0.078 mol) of dicarboxy 4-4'diphenyl ether
- 13.02 g (0.078 mol) of di(p-carboxy benzyl) terephthalate
- 3.22 g (0.012 mol) of sodium dicarboxy 3-5 benzene sulfonate
- 139 g of N-methyl 2-pyrrolidone, the amount necessary to adjust the concentration of the reagents to 30 g (of final polymer) in 100 g of solution.

The temperature is raised in 2 hours up to 180°C and stabilized at this value for 30 minutes; a strong liberation of $CO_2$ takes place at the start of the heating. After dilution with N-methyl 2-pyrrolidone, there is obtained a collodion whose dry extract is 20.35%, expressed in weight, for 100 g of solution the viscosity of which is 65 poises. The inherent viscosity of the polymer is 0.74.

From this solution there are produced, a film by casting, in constant thickness and then drying in a stove, first of all under ambient atmosphere and then under vacuum while the temperature rises up to 160°C.

EXAMPLE 2

Into a 4-liter reactor provided with heating and agitating means and at a starting temperature of 120°C there are introduced:

- 302 g (1.19 mol) of 98.75% diisocyanato 4-4' diphenyl methane
- 316 g (0.835 mol) of 99.85% dicarboxy 4-4' diphenyl ether
- 96.4 g (0.22 mol) of 99% di(p-carboxy benzyl) terephthalate
- 11.8 g (0.044 mol) of sodium dicarboxy 3-5 benzene sulfonate
- 1.235 g of N-methyl 2-pyrrolidone.

The temperature of the reaction mass is raised gradually and at the end of 30 minutes is 135°C; at the same time a liberation of $CO_2$ takes place; at the end of 1 hr. 40 min. it is 180°C and is stabilized at this value for 30 minutes; after dilution with 325 ml of N-methyl pyrrolidone and cooling, the viscosity of the final solution is 300 poises, the dry extract is 25.1 g per 100 g of solution and the inherent viscosity of the polymer is 0.76. This collodion is wet spun under the following conditions: the spinneret comprising 64 apertures of 0.06 mm diameter and the temperature of which is 25°C is immersed in a coagulation bath formed of 52% N-methyl 2-pyrrolidone and 48% water (expressed as weight/weight) the temperature of which is 20°C; the solution coming from the spinneret after a path of 45 cm in said bath at a speed of 11 m/min gives a coagulated yarn which is drawn in air at a ratio of 2.18 x and then washed with water on multiple-turn rolls, dried, and wound up at a speed of 24 m/min.

Its mechanical properties are:

| Size | 4.98 dtex |
|---|---|
| Tenacity | 8.52 g/tex |
| Elongation | 13.3% |

This yarn can be over-drawn by passage through a tube at 250°C under nitrogen or air at a speed of 15 m/min, an over-draw ratio of 1.22 x brings the mechanical properties to:

| Size | 3.35 dtex |
|---|---|
| Tenacity | 13.7 g/tex |
| Elongation | 12.3% |

The thermal properties of these yarns, in the form of desized knit of a weight of 90 g/m² are as follows:

The differential thermal analysis curve shows two endothermal peaks at 353°C and 437°C; therefore no substantial physical transformation takes place below 350°C.

The results of the inflammability tests are given in the following table:

TABLE II

|  | Oxygen* Index | Height destroyed in cm | Application of the flame in sec | Duration of combustion in sec | Post-incandescence in sec |
|---|---|---|---|---|---|
| Oxygen Index | 23% | | | | |
| AATCC Test 34-1969 | | 14 | | 8 | 0 |
| Gas-flame test | | | 5 | 42 | 0 |
| | | | 10 | 20 | 0 |
| | | | 20 | 26 | 0 |
| | | | 30 | 18 | 0 |

*min. conc. of oxygen for combustion

EXAMPLE 3

The preparation of the monosodium salt of bis (carboxy-4-phenyl) phosphinic acid is carried out in the following manner:

Into a 20-liter round-bottom reactor there are introduced:

2448 g(8 mols) of bis (carboxy-4-phenyl) phosphinic acid
10 liters of N-methyl-2-pyrrolidone Dissolving is effected with a deflocculating turbine in 10 minutes at room temperature; a few impurities remain undissolved and are eliminated by settling and filtration. The solution is then charged again into the reactor and, with vigorous agitation by means of the turbine, 310 g (7.76 mol) of soda and 2 liters of permutized water are added rapidly drop by drop for 1 hour.

After 30 minutes, precipitation commences; the temperture of the medium rises to 45°C. Cooling is effected with agitation. It is set aside overnight. It is them filtered on a Buchner funnel containing diatrose and flanelette. The filtrate is light yellow and the precipitate very white. It is dried for one day in a stove in a moist vacuum, gradually increasing the temperature up to 200°C.

The yield is 88.7% and the —COOH ratio 97.5% with respect to theoretical.

For the production of the polymer, there are then introduced into a 500-ml reactor, provided with heating and agitating means, and the temperature of which is brought to 120°C:

39.75 g (0.159 mol) of diisocyanato-4-4'-diphenyl methane
26.70 g (0.103 mol) of dicarboxy-4-4'-diphenyl ether
16.27 g (0.0375 mol) of di-(p-carboxy benzyl) terephthalate
2.95 g (0.009 mol) of monosodium salt of bis(carboxy-4-phenyl) phosphinic acid
164 g of N-methyl-2-pyrrolidone.

The temperature of the reaction medium is brought to 130°C within 30 minutes and then held stable at this value for 40 minutes; a strong liberation of $CO_2$ takes place; thereupon the increase in temperature is continued so as to reach 180°C at the end of 1 hr. 50 min.; it is maintained at this temperature for 1 hr. and at the same time there is gradually added a sufficient amount of N-methyl 2-pyrrolidone to obtain a final viscosity of the solution of 375 poises.

The dry extract of this solution them constitutes 17.65%, expressed by weight, and the inherent viscosity of the polymer is 1.02.

After a second dilution to lower the absolute viscosity of the solution to 100 poises, films of an initial thickness of 0.40 mm are produced by pouring onto a glass plate; they are then dried under vacuum at 200°C for 5 hrs.

These slightly colored films have an Oxygen Index (min. conc. of oxygen for combution of 25%). The behavior in the gas-flame test is shown in Table III.

TABLE III

| Application of the flame in sec | Duration of combustion in sec | Post-incandescence in sec |
|---|---|---|
| 5 | 2 | 1 |
| 10 | 1 | 2 |
| 20 | 1 | 0 |
| 30 | 0 | 0 |

This table shows in particular that there is no post-incandescence, and after the test a large carbonized residue is found. The differential thermal analysis curve is uniform up to 450°C; the product therefore does not melt below this temperature.

The mechanical properties and the resistance to chemical attack by organic solvent, acid and base are summarized in Table IV. The drawn film exhibits excellent behavior with respect to these products.

TABLE IV

| Condition of the film | Treatment | Tenacity g/mm² | Gain (+) or loss (−) of tenacity % | Elongation % | Gain (+) or loss (−) in elongation % |
|---|---|---|---|---|---|
| Non-drawn | | 7,000 | | 10.6 | |
| Drawn* | | 9,350 | | 12.7 | |
| Drawn | 10 min at 60°C in perchlorethylene | | +4.27% | | +52% |
| Drawn | 30 min in a 2% aqueous solution of $H_2SO_4$ (% by wt) at the boiling point | | +4.27% | | +5.5% |
| Drawn | 30 min in a 5% aqueous solution of NaOH (% by wt) at the boiling point | | −4.27% | | −5.5% |

*The conditions for drawing are as follows:
temperature 270°C
drawing speed 1 cm/min
draw ratio 1.5 ×

EXAMPLE 4

Into a 500-ml reactor similar to that of Example 3 there are introduced:

- 33.20 g (0.133 mol) of diisocyanato-4-4'-diphenyl methane
- 14.44 g (0.0565 mol) of dicarboxy-4-4'-diphenyl methane
- 24.48 g (0.0565 mol) of di- (p-carboxy benzyl) terephthalate
- 2.36 g (0.0072 mol) of monosodium salt of bis (carboxy-4-phenyl) phosphonic acid prepared in accordance with Example 3.
- 149 g of N-methyl-2-pyrrolidone, the amount necessary to adjust the concentration of the resultant polymer to 30%.

The temperature is increased within 2 hours to 180°C. with a stay of 20 minutes at 150°C, during which a strong liberation of $CO_2$ takes place, and then stabilized at this value for 30 minutes. To the resultant solution there is added the amount of N-methyl 2-pyrrolidone necessary to decrease the viscosity to 300 poises (the corresponding dry extract is 20.60%, expressed by weight), and then to 100 poises in a second stage.

By pouring this last-mentioned solution onto a glass plate and then drying in an oven at a temperature below 200°C there are obtained films of a thickness of between 60 and 100μ.

The polymer of which they are formed has an inherent viscosity of 1.26.

These films, which are slightly yellow in color, have the following mechanical properties:

| | |
|---|---|
| Ultimate strength | 7,200 kg/mm² |
| Elongation | 6.5% |

The differential thermal analysis curve, which is uniform up to 450°C, shows an absence of melting.

The inflammability and post-incandescence properties are shown in Table V.

TABLE V

| | "OXYGEN"* index | Height destroyed in cm | Application of the flame in sec | Duration of combustion in sec | Post-incandescence in sec |
|---|---|---|---|---|---|
| "CLOC" index | 24.4 | | | | |
| AATCC Test 34-1969 | | 7 | | 0 | 0 |
| Gas-flame test | | | 5 | 2 | 0 |
| | | | 10 | 3 | 0 |
| | | | 20 | 0 | 0 |
| | | | 30 | 0 | 0 |

*Min. Conc. of Oxygen for Combustion

This test shows that, for standard polycondensation conditions, there is obtained a product of particularly high inherent viscosity, having very good non-flammability and post-incandescence characteristics.

EXAMPLE 5

Into an apparatus identical to that of Example 3 there are introduced:

32.37 g (0.128 mol) of diisocyanato-4-4'-diphenyl ether
20.74 g (0.0805 mol) dicarboxy-4-4'-diphenyl ether
13.02 g (0.03 mol) of di-(p-carboxy benzyl) terephthalate
3.15 g (0.0096 mol) of monosodium salt of bis (carboxy-4-phenyl) phosphinic acid as prepared in Example 3
137 g of N-methyl-2-pyrrolidone The temperature is increased in 1 hr. 15 min. to 180°C; the liberation of $CO_2$ taking place above 100°C; at this stage of the operation there is added an amount of N-methyl 2-pyrrolidone such that the concentration of polymer in the solution is 20% by weight; the total duration of the operation is 2 hrs.

Upon another dilution there is obtained a solution having the following properties:

| | |
|---|---|
| Absolute viscosity | 200 poises |
| Dry extract | 15.90 g for 100 g of solution |
| Inherent viscosity of the polymer | 0.95 |

For the production of films, the absolute viscosity of this solution is reduced to 100 poises by a further addition of N-methyl 2-pyrrolidone. After pouring onto a glass plate and then drying in an oven, there are obtained transparent, practically uncolored films of an initial thickness of 0.70 mm, the properties of which are given in Table VI.

TABLE VI

| | Height destroyed in cm | Application of the flame in sec | Duration of combustion in sec | Post-incandescence in sec |
|---|---|---|---|---|
| Ultimate strength g/mm² 8.100 | | | | |
| Elongation upon rupture % 6.6 | | | | |
| "Oxygen"* Index 26.1 | | | | |
| AATCC Test 34-1969 | 6 | | 0 | 0 |
| Gas-flame test | | 5 | 0 | 0 |
| | | 10 | 1 | 0 |
| | | 20 | 0 | 0 |
| | | 30 | 0 | 0 |

*Min. Conc. of oxygen for combustion

Furthermore, the differential thermal analysis curve does not show any specific point.

These results show that the presence of monosodium salt of bis (carboxy-4-phenyl) phosphinic acid in the reaction medium makes it possible to obtain a polymer of high inherent viscosity and to produce a practially colorless film which is non-flammable and without post-incandescence.

EXAMPLE 6

Into a 4-liter reactor provided with heating and agitating means and brought to a temperature of 90°C there are introduced:
266 g (1.06 mol) of diisocyanato-4-4'-diphenyl methane of 98.75%
178.3 g (0.69 mol) of dicarboxy-4-4'-diphenyl ether
110.0 g (0.249 mol) of 98% di-(carboxy-4-benzyl) terephthalate
20 g (0.061 mol) of monosodium salt of bis (carboxy-4-phenyl) phosphinic acid as prepared in Example 3
1.255 g of N-methyl-2-pyrrolidone The temperature is brought to 180°C in 2 hrs, with an intermediate stop of 30 minutes at 135°C; a strong liberation of $CO_2$ takes place primarily during the first hour; above 135°C, successive quantities of N-methyl 2-pyrrolidone are added such that the viscosity does not increase above 1,200 poises and is reduced at the end of the operation to 440 poises.

The dry extract of this solution is then 17.1% (by weight) and the inherent viscosity of the polymer is 1.12.

The solution is them wet-spun under the following conditions:

The spinneret, having 64 orifices of 0.05 mm, at a temperature of 90°C, is immersed in a coagulation bath formed of 52% N-methyl 2-pyrrolidone and 48% water (expressed in weight/ weight) the temperature of which is 20°C and the length 45 cm; the speed of spinning is 11 m/min.

The coagulated yarn then passes over water-washing rolls at a speed of 23 m/min and is then drawn in air at a ratio of 2.10 X and sized.

The mechanical properties of the resultant yarn are:

| | |
|---|---|
| Denier per filament | 5.27 dtex |
| Tenacity | 10.9 g/tex |
| Elongation | 15.4 % |

This yarn can be over-drawn by passage at a speed of 15 m/min through a tube brought to 250°C.

The over-draw ratio of 1.71 X makes it possible to bring the mechanical properties of the yarn to the following values:

| | |
|---|---|
| Denier per filament | 2.97 dtex |
| Tenacity | 22.4 g/tex |
| Elongation | 10.9 % |

The inflammability tests, carried out on knitted fabrics, give the following values:

| | |
|---|---|
| Oxygen Index | 25.3 |
| AATCC Test 34-1969 | Height destroyed 9 cm Duration of combustion 6 sec. |

The inherent viscosity of 1.12 of the polymer and the absence of post-incandescence are two significant properties to be credited to the new polymer of this example.

I claim:
1. A difficulty inflammable filament, thread, fiber or film of aromatic carbocyclic copolyester amide polymers consisting essentially of
   about 40 to 55% of units of the formula —NH—Ar$_1$—NH— and
   about 60 to 45% of acid units of the formula:

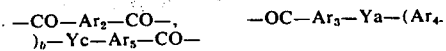

and

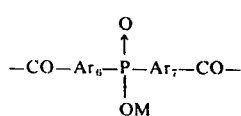

wherein $Ar_1$, $Ar_2$, $Ar_3$, $Ar_4$, $Ar_5$, $Ar_6$ and $Ar_7$ represent a divalent aromatic carbocyclic radical, Y is

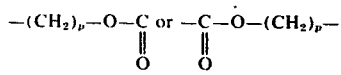

with $p \geq 1$, $a$, $b$ and $c$ being equal to 0 or 1, at least one of the subscripts $a$ or $c$ being equal to 1, and M is an alkali metal, and the proportions of the units —CO—$Ar_2$—CO—, —OC—$Ar_3$—Ya—($Ar_4$-$)_b$—Yc—$Ar_5$—CO— and

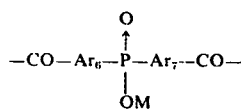

being such that there are at least 15 ester bonds per 100 total amide and ester bonds and 4–30 mol. % of said phosphorus-containing units.

2. The filament, thread, fiber or film of claim 1 having a melting point above 300°C.

3. The filament, thread, fiber or film of claim 1 wherein said phosphorus-containing units are present in an amount of 6–20 mol. %.

4. A process for producing film or fiber forming copolyesteramides according to claim 1, by reacting in substantially stoichiometric quantity at least one (1) aromatic carbocyclic diisocyanate and (2) aromatic carbocyclic dicarboxylic acids, at least one of said acids containing one or two ester groups, with 4–30 mol. %, with respect to the acid units, of (3) a phosphorus-containing dicarboxylic acid of the formula

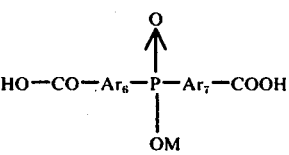

in an inert, anhydrous, aprotic, polar solvent medium, the temperature being increased gradually to 200°C.

5. The process of claim 4, wherein said phosphorus-containing dicarboxylic acid is present in an amount of 6 to 20 mol. %.

* * * * *